US008837578B2

(12) United States Patent
Gavade et al.

(10) Patent No.: US 8,837,578 B2
(45) Date of Patent: Sep. 16, 2014

(54) MPEG-W DECODER

(75) Inventors: Sameer Vasant Gavade, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 358 days.

(21) Appl. No.: 13/049,204

(22) Filed: Mar. 16, 2011

(65) Prior Publication Data
US 2012/0236930 A1   Sep. 20, 2012

(51) Int. Cl.
| H04N 7/26 | (2006.01) |
| H04N 21/845 | (2011.01) |
| H04N 21/462 | (2011.01) |
| H04N 21/658 | (2011.01) |
| H04N 21/442 | (2011.01) |
| H04N 21/6373 | (2011.01) |
| H04N 19/164 | (2014.01) |
| H04N 7/18 | (2006.01) |
| H04N 19/162 | (2014.01) |

(52) U.S. Cl.
CPC ..... H04N 19/00236 (2013.01); H04N 21/8455 (2013.01); H04N 21/4621 (2013.01); H04N 21/6582 (2013.01); H04N 21/44209 (2013.01); H04N 19/0023 (2013.01); H04N 21/4424 (2013.01); H04N 21/6373 (2013.01)
USPC .......................................... 375/240; 725/62

(58) Field of Classification Search
USPC .......................................... 375/240; 709/231
See application file for complete search history.

(56) References Cited

U.S. PATENT DOCUMENTS

| 5,838,927 | A  | * | 11/1998 | Gillon et al. .................. 709/247 |
| 7,260,651 | B2 | * | 8/2007 | Parrella et al. ................ 709/247 |
| 7,640,362 | B2 | * | 12/2009 | Brooks et al. ................. 709/247 |
| 2003/0078964 | A1 | * | 4/2003 | Parrella et al. ................ 709/203 |
| 2003/0177255 | A1 | * | 9/2003 | Yun ................................. 709/231 |
| 2005/0071876 | A1 | * | 3/2005 | van Beek ......................... 725/62 |
| 2005/0160177 | A1 | * | 7/2005 | Kim .............................. 709/231 |
| 2008/0291926 | A1 | * | 11/2008 | Hayashi ......................... 370/400 |
| 2010/0074324 | A1 | * | 3/2010 | Qian et al. ............... 375/240.02 |
| 2010/0317443 | A1 | * | 12/2010 | Cook et al. ...................... 463/42 |
| 2012/0236930 | A1 | * | 9/2012 | Gavade et al. ........... 375/240.02 |

* cited by examiner

*Primary Examiner* — Sath V Perungavoor
*Assistant Examiner* — Howard D Brown, Jr.

(57) ABSTRACT

A device comprising a Moving Picture Experts Group (MPEG)-W decoder; and one or more processing systems to execute the instructions of the MPEG-W decoder, which configure the one or more processing systems to receive a request for streaming content; select an estimate of a bandwidth for a connection between a destination device and a source device; select a device type pertaining to the destination device; generate a stream request that includes an MPEG-W link, the estimate of the bandwidth, the device type, the MPEG-W link including an address pertaining to the source device, a name of the streaming content, and a file extension of an MPEG-W format; transmit the stream request to the source device; select a streaming content based on the stream request; wherein the streaming content has a resolution corresponding to the estimate of the bandwidth; and transmitting the streaming content to the destination device.

19 Claims, 8 Drawing Sheets

MPEG-W DECODER

BACKGROUND

User-demand for streamed content continues to grow given the wide array of devices to which content may be streamed. For example, a user may enjoy streaming content via a handheld device, a desktop computer, or a television.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "content," as used herein, is intended to be broadly interpreted to include audio data and/or video data. For example, the content may take the form of music, Internet radio, television content (e.g., a movie, a television show, etc.), or other forms of streaming media (e.g., graphics, video conferencing, slide shows, web tours, or other real-time applications). Streaming content typically denotes digital audio data or digital video content, however, other forms of data (e.g., haptic data, etc.) may be streamed.

There are various forms of streaming, such as, for example, live streaming, on-demand streaming, near-demand streaming (e.g., when content is not available 24-7, but is provided on-demand with time constraints), true streaming (e.g., when content takes a few seconds to buffer before playing, but is not stored on a user device), and progressive streaming (sometimes referred to as progressive download), in which the content is stored on a user device before playback. In addition to the different forms of streaming, there are various architectures that may be used for streaming, such as a client-server architecture or a peer-to-peer architecture.

A codec is often used during a streaming process. A codec is a coder-decoder capable of encoding and/or decoding content. For example, a codec will compress audio content or video content to permit the content to be streamed from one device to another device via a network connection and played on a player. Moving Picture Experts Group (MPEG) includes a family of compression standards and formats (e.g., MPEG-1, MPEG-2, MPEG-3, MPEG-4, etc.). MPEG algorithms may compress content to allow for transmission and subsequent decompression upon receipt. For example, MPEG encoders are used to encode content to an MPEG format and MPEG decoders are used to decode content from the MPEG format. There are various players available to users that are compatible with the MPEG format.

According to exemplary embodiments, a modified MPEG format is introduced called an MPEG-W format. The MPEG-W format may include an MPEG-W decoder. According to an exemplary embodiment, the MPEG-W decoder may be implemented as a bifurcate system. For example, a source device (e.g., a server device, a peer device, etc.) may include a source-side MPEG-W (S-MPEG-W) decoder, and a destination device (e.g., a client device, a peer device, etc.) may include a destination-side MPEG-W (D-MPEG-W) decoder. According to other embodiments, an S-MPEG-W decoder and a D-MPEG-W decoder may be included in a single device. Additionally, or alternatively, an MPEG-W decoder may include the S-MPEG-W decoder and the D-MPEG-W decoder.

According to an exemplary implementation, the S-MPEG-W decoder and the D-MPEG-W decoder may be implemented as an application. For example, a content player application that is capable of playing content may include the S-MPEG-W decoder and/or the D-MPEG-W decoder. Alternatively, the S-MPEG-W decoder and/or the D-MPEG-W decoder may be implemented within other types of applications, such as, for example, a web streaming application, a web service application, a server application, a client application, a peer application, or as a stand-alone application.

According to an exemplary embodiment, the MPEG-W format may include a location-transparent architecture as it pertains to content. For example, a user may initiate a streaming process by selecting an MPEG-W link. The MPEG-W link may include an address (e.g., a Uniform Resource Identifier (URI), a Uniform Resource Locator (URL), a network address, a network address and a port number, etc.) and a name of the content. The MPEG-W link may also include an MPEG-W extension (e.g., .mpw).

In response to the user's selection of the MPEG-W link, a D-MPEG-W decoder may send a streaming request for content to an S-MPEG-W decoder. The streaming request may include the MPEG-W link and an estimate of a bandwidth for a connection between a destination device, which includes the D-MPEG-W decoder, and a source device, which includes the S-MPEG-W decoder. According to an exemplary embodiment, the streaming request may also include other types of information pertaining to the requested content and/or the capabilities of the destination device. For example, the streaming request may include resolution information (e.g., for video content (640×480, 720×1280 high-definition, standard definition, 1080p, 720p, 480p, etc.), for audio content (16-bit, 24-bit, etc.)), a size of a display pertaining to the destination device, and/or the type of destination device (e.g., a personal computer (PC), a mobile phone, etc.). According to an exemplary implementation, the resolution information may be identified based on the estimate of the bandwidth and/or the size of the display. Additionally, according to an exemplary implementation, the name of content may include an extension that identifies a type of content (e.g., a video file may have a name "Teeth.mp4v"; an audio file may have a name "It's for you.mp3"). Alternatively, the MPEG-W link format may include a content descriptor that identifies the type of content (e.g., audio, video).

According to an exemplary embodiment, the D-MPEG-W decoder may include a bandwidth measuring component that determines the current bandwidth. For example, the bandwidth measuring component may estimate a bandwidth based on conventional techniques, such as, for example, arrival times of packets, test traffic (e.g., dummy packets), variable packet size probing, packet pair/train dispersion probing, an active bandwidth estimation tool (e.g., per-hop capacity estimation tool, end-to-end estimation tool, etc.), etc. The term "packet," as used herein, is intended to be broadly interpreted to include, include a data transmission or communication, the packaging of which may correspond to, for example, a packet, a cell, a frame, a datagram, some other type of container or unit of data, and/or a fragment thereof. According to an exemplary implementation, the amount of bandwidth may be equivalent to the maximum throughput or the effective throughput (i.e., actual throughput). However, according to other implementations, bandwidth may be equivalent to the slowest link in an end-to-end path or some other path-based evaluation.

The D-MPEG-W decoder may also consider resource utilization pertaining to the destination device in which the D-MPEG-W decoder resides, such as, for example, processing unit utilization, network activity (e.g., number and/or type of other connections between the destination device and other devices, networks, and/or systems), etc. For example, the D-MPEG-W may adjust an available bandwidth value (e.g., lower a bandwidth estimate or raise a bandwidth estimate), relative to an initial estimate of the bandwidth included in the streaming request or some other previous estimate of bandwidth, when the resource utilization is above or below a threshold value or within a range of values. For example, the D-MPEG-W decoder may use a table or other data structure that maps resource utilization value(s) to bandwidth value(s). According to other embodiments, the D-MPEG-W decoder may not consider resource utilization pertaining to the destination device.

Based on the streaming request, the S-MPEG-W decoder may select the appropriate content and stream the content to the D-MPEG-W decoder. According to an exemplary embodiment, the S-MPEG-W decoder may open the content (e.g., a file), read or decode the content, and package the content for streaming. For example, the S-MPEG-W decoder may partition (e.g., chunk) the content for streaming. The S-MPEG-W decoder may then stream the partitioned content to the D-MPEG-W decoder.

If the bandwidth should change (e.g., within a certain range) during the streaming of content, the D-MPEG-W decoder may send an update message to the S-MPEG-W decoder. For example, the update message may indicate an updated estimate of the current bandwidth and a position point pertaining to the content (e.g., a Global Positioning System (GPS) Time code that is encoded in the content). Based on update message, S-MPEG-W decoder may select the appropriate content, in view of the current estimate and the position point. S-MPEG-W decoder may open the selected content (e.g., a file), read or decode the content, and locate the GPS position in the selected content based on the position point. S-MPEG-W decoder may then begin partitioning (e.g., chunking) the content, at that position point, and stream the partitioned content to D-MPEG-W decoder. Thus, the S-MPEG-W decoder provides multi-rate streaming support.

In contrast to adaptive streaming, according to an exemplary embodiment, the MPEG-W format (i.e. the format itself) provides for the selection of the content, the streaming of the content, the playing of the content, and the adaptation support for the content.

Figure 1A:
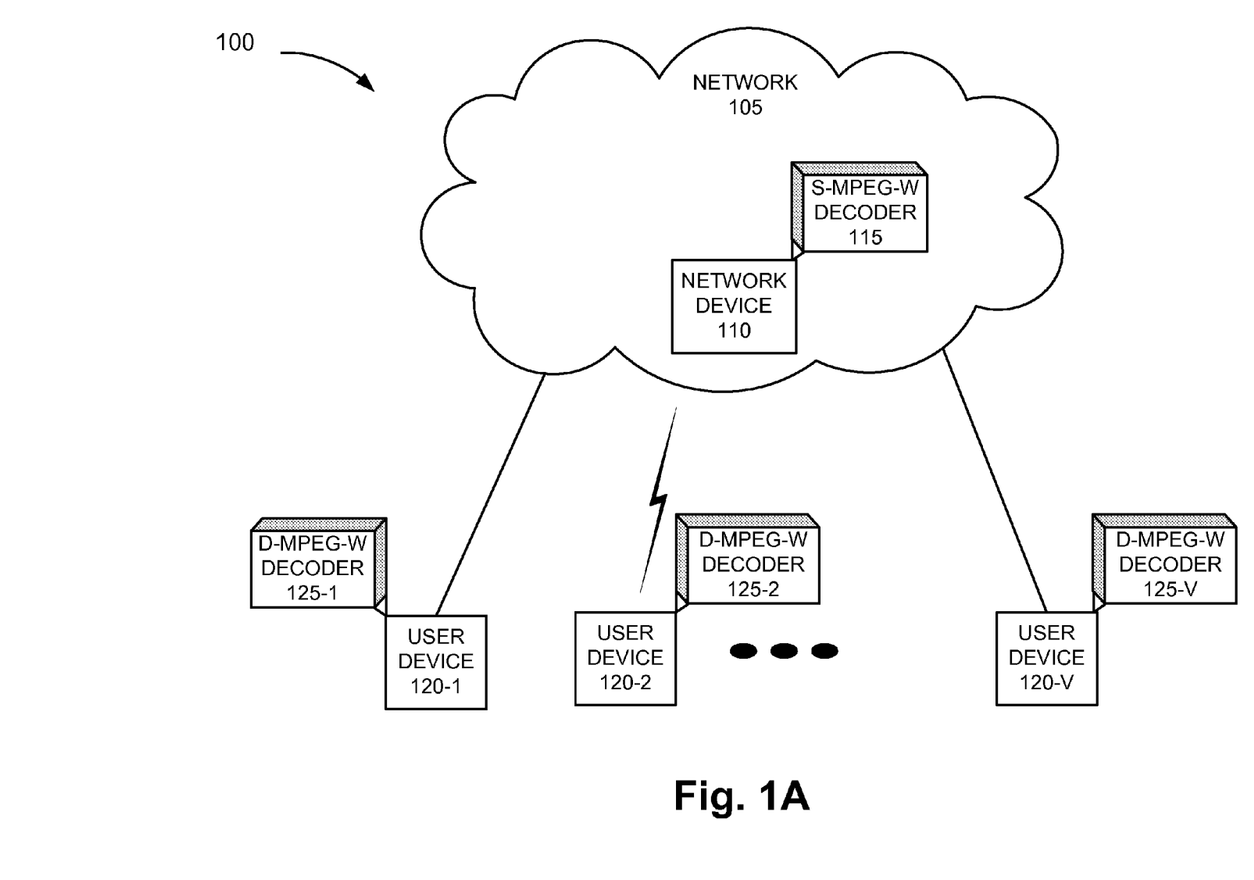
FIG. 1A is a diagram illustrating an exemplary environment in which an exemplary embodiment of an MPEG-W decoder may be implemented.

FIG. 1A is a diagram illustrating an exemplary environment 100 in which an exemplary embodiment of an MPEG-W decoder may be implemented. As illustrated in FIG. 1A, exemplary environment 100 may include a network 105 that includes a network device 110 and an S-MPEG-W decoder 115, and user devices 120-1 through 120-V (referred to as user devices 120, or individually as user device 120) that respectively include D-MPEG-W decoders 125-1 through 125-V (referred to as MPEG-W decoders 125, or individually as MPEG-W decoder 125), in which V>2.

The number of devices and configuration in environment 100 is exemplary and provided for simplicity. According to other embodiments, environment 100 may include additional devices, fewer devices, different devices, and/or differently arranged devices than those illustrated in FIG. 1A. For example, according to other embodiments, there may be multiple network devices 110 that include S-MPEG-W decoders 115 and/or fewer user devices 120 that include D-MPEG-W decoders 125. According to an exemplary embodiment, a device may include both a D-MPEG-W decoder 125 and an S-MPEG-W decoder 115. Additionally, or alternatively, according to other embodiments, environment 100 may not include network 105 and/or network device 110 (e.g., in a peer-to-peer architecture). Environment 100 may include wired (e.g., electrical, optical) and/or wireless connections among the devices illustrated.

Network 105 may include one or multiple networks of one or multiple types. For example, network 105 may include the Internet, a wide area network, a private network, a public network, an intranet, a local area network, a packet-switched network, a wired network (e.g., an optical network, a cable network, etc.), a wireless network (e.g., a mobile network, a cellular network, a non-cellular network, etc.), etc. Network 105 may operate according to various protocols. Typically, the process of streaming of content may use real-time protocols (e.g., Real-time Transport Protocol (RTP), Real-Time Control Protocol (RTCP), Real-Time Streaming Protocol (RTSP), etc.), however, other protocols may be used depending on the implementation. Although not illustrated, network 105 may include various other network devices, such as, one or multiple security devices, routing devices, gateways, access points, etc.

Network device 110 may include a computing device that is capable of streaming content to another device. For example, network device 110 may correspond to a server device when implementing an embodiment having a client-server architecture. The server device may take the form of a web server, an application server, a virtual server, an audio/video server, a file server, or some other type of network server.

As previously described, according to an exemplary embodiment, an MPEG-W decoder may be partitioned into multiple parts. According to this example, network device 110 includes S-MPEG-W decoder 115 and user device 120 includes S-MPEG-W decoder 125.

S-MPEG-W decoder 115 and D-MPEG-W decoder 125 may include the functionality of a conventional MPEG decoder in that these decoders may decode content in the MPEG format. S-MPEG-W decoder 115 may perform additional functions, such as, for example, selecting the appropriate streamed content based on current bandwidth, other parameters, etc., as previously described. D-MPEG-W decoder 125 may perform additional functions, such as, for example, measuring bandwidth, monitoring resource utilization, using other types of information pertaining to the content and/or the capabilities of the device, etc., as previously described.

User device 120 may correspond to various types of user devices. User device 120 may be a stationary device, a portable device, a handheld or palmtop device, or a mobile device. For example, user device 120 may take the form of a computer (e.g., a desktop computer, a laptop computer, a palmtop computer, a tablet computer, a netbook, etc.), a personal digital assistant (PDA), a personal communication system (PCS) terminal, a Web or Internet access device, or some other communication device. User device 120 may include multiple devices (e.g., a set top box and a television, etc.).

FIGS. 1B-1E are diagrams illustrating an exemplary streaming process that includes the MPEG-W decoder described herein. According to an exemplary scenario, and referring to FIG. 1B, a user (not illustrated) may wish to view a video. The user may launch a client application and select an MPEG-W link stored on user device 120-1. The MPEG-W link may include an address (e.g., a URL) and the name of the content. D-MPEG-W 125-1 may generate a stream request 130 based on the user's selection of the MPEG-W link. Stream request 135 may include the MPEG-W link and an estimate of the bandwidth. In this example, since a connection between user device 120-1 and network device 110 has not yet been established, D-MPEG-W decoder 125-1 may select an estimate of the bandwidth based on one or more techniques. For example, according to one implementation, D-MPEG-W decoder 125-1 may select a default estimate (e.g., a lowest bandwidth value, or some other bandwidth value). The default estimate may be derived from a bandwidth connection history (e.g., an average bandwidth value based on previous streaming sessions) or knowledge of the connection capabilities of the destination device (e.g., the type of connection, such as an optical connection, a cable connection, etc.). Stream request 135 may also include other types of information pertaining to user device 120-1 (e.g., resolution information, size of the display of user device 120-1, type of user device, etc.). Stream request 135 may be sent to S-MPEG-W decoder 115 of network device 110.

Figure 1B:
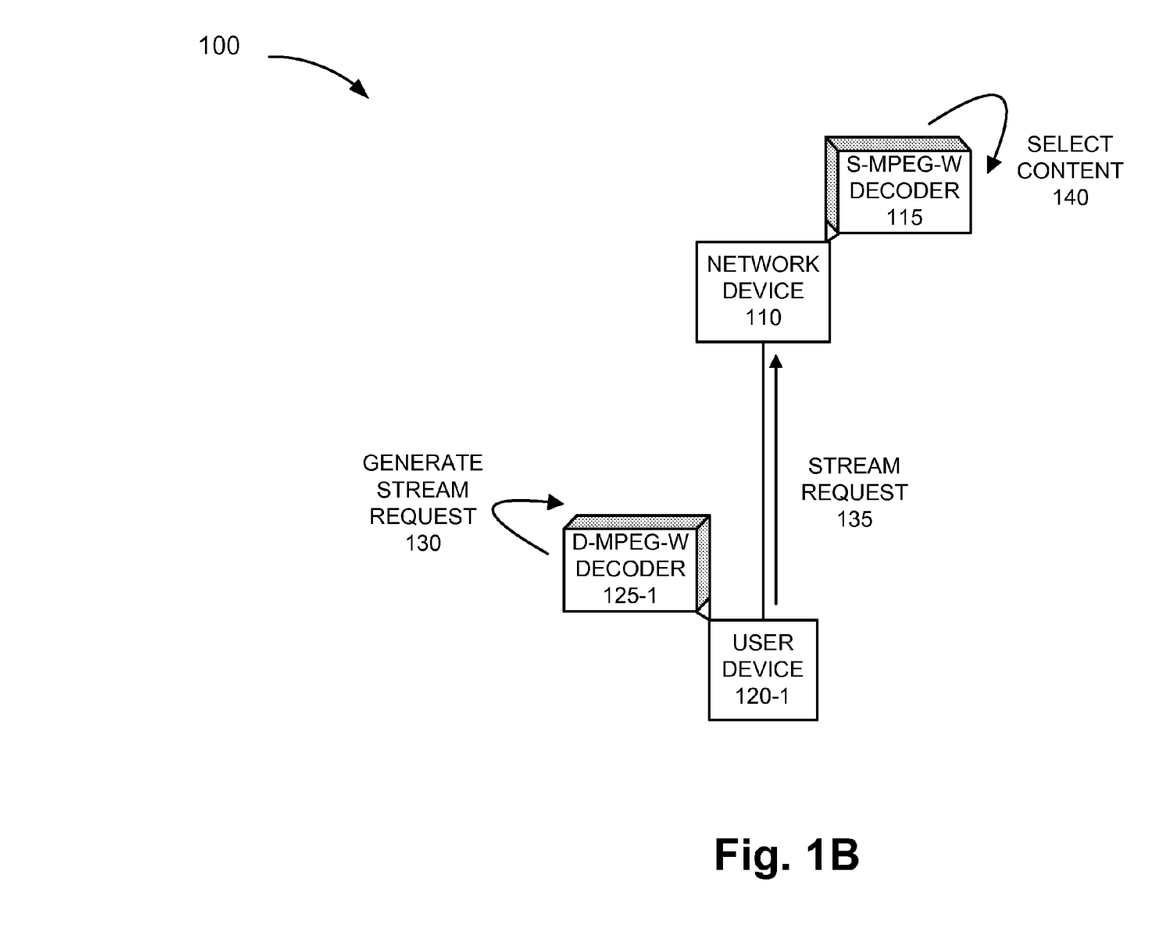
FIGS. 1B-1E are diagrams illustrating an exemplary streaming process that includes the MPEG-W decoder depicted in FIG. 1A.

As further illustrated in FIG. 1B, S-MPEG-W decoder 115 may select the appropriate content based on stream request 135. For example, network device 110 may store a table or other data structure that maps content to bandwidth. The content may also be mapped to other types of information included in stream request 135. Network device 110 may store or have access to content of varying resolutions, etc.

Figure 1C:
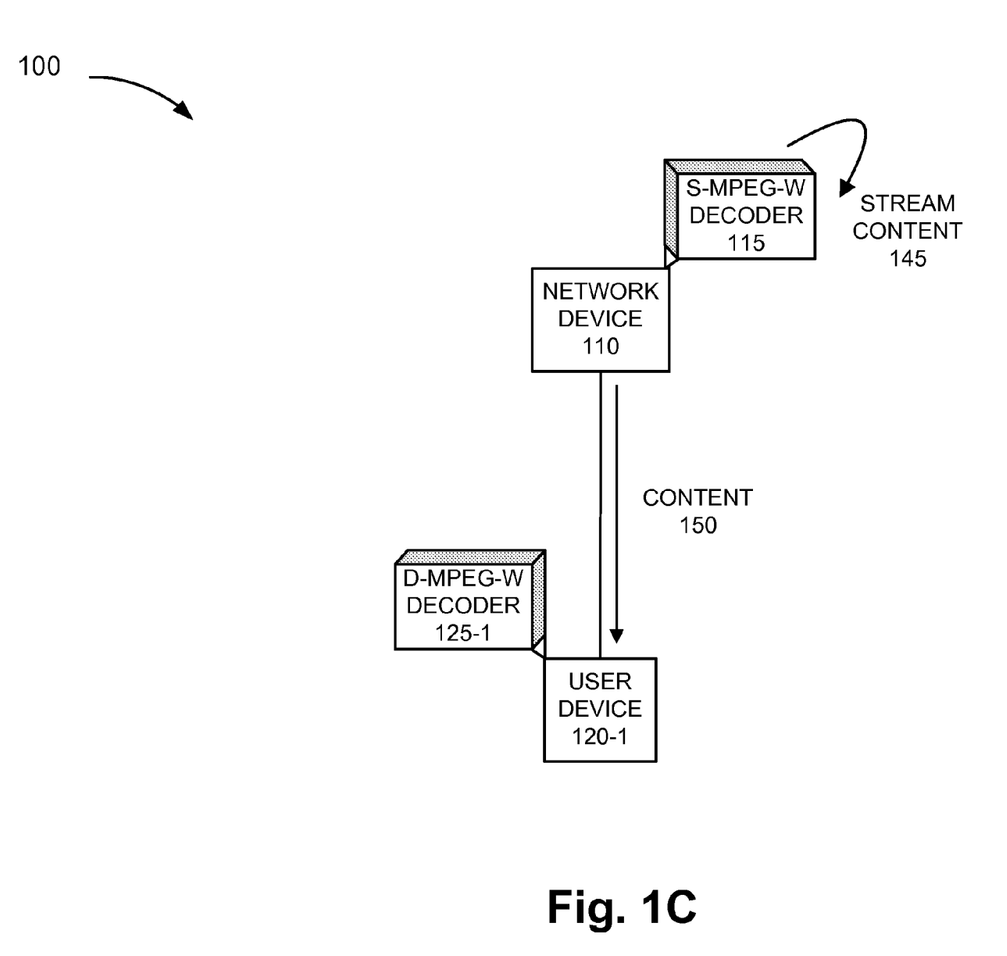
Figure 1D:
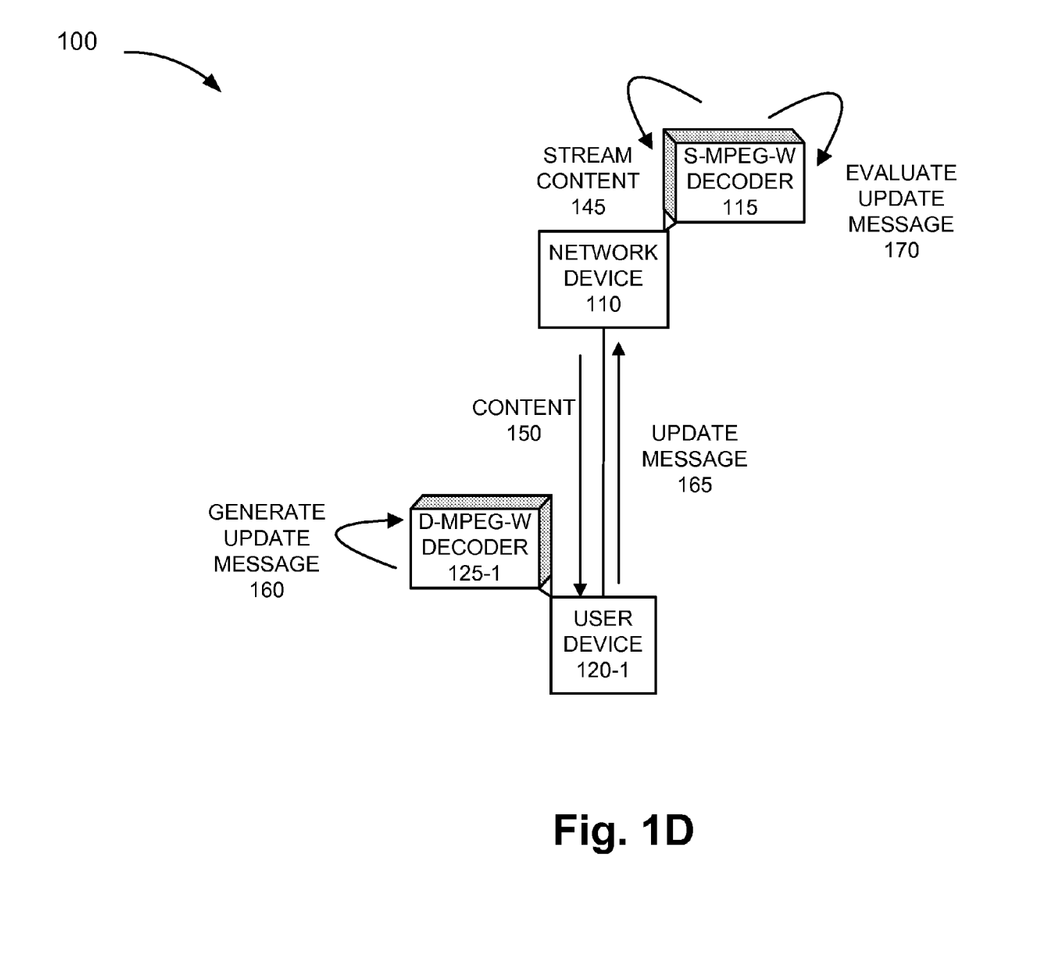

Referring to FIG. 1C, S-MPEG-W decoder 115 may begin streaming content 145 to user device 120-1, which may include partitioning the selected content. Content 150 may be sent to user device 120-1. As illustrated in FIG. 1D, as content 150 is being streamed to user device 120-1, D-MPEG-W decoder 125-1 may generate an update message 160. For example, D-MPEG-W decoder 125-1 may continue to monitor the available bandwidth. In this example, it may be assumed that the available bandwidth has changed significantly. User device 120-1 may send update message 165 to S-MPEG-W decoder 115. Update message 165 may include an updated bandwidth value (or range). Update message 165 may also include a position point pertaining to content 150 received by user device 120-1. As further illustrated in FIG. 1D, S-MPEG-W decoder 115 may evaluate update message 165 and determine whether a different resolution of content 150 should be streamed. In this example, S-MPEG-W decoder 115 may determine that a different resolution of content 150 needs to be streamed based on the significant change in bandwidth indicated by the updated bandwidth value (or range).

Figure 1E:
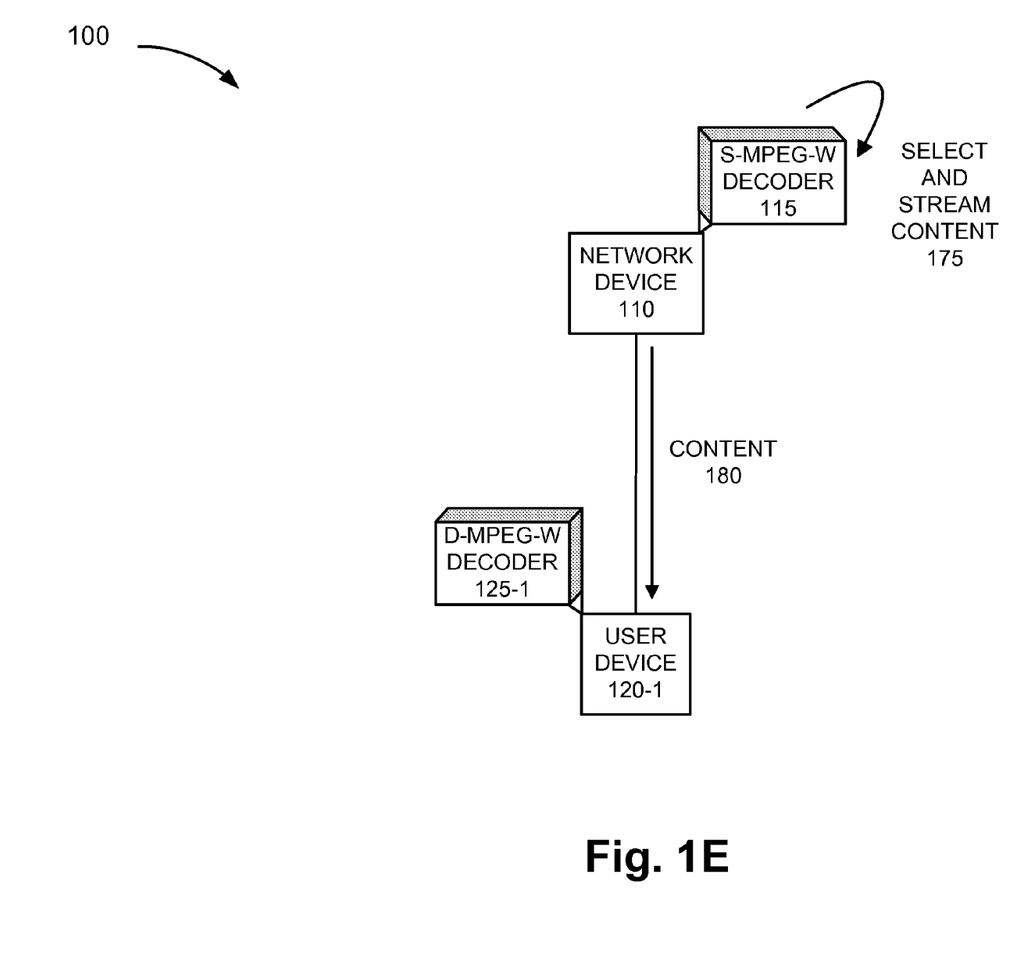

Referring to FIG. 1E, S-MPEG-W decoder 115 may select and stream content 175. For example, S-MPEG-W decoder 115 may select the content having the appropriate resolution. Additionally, S-MPEG-W decoder 115 may begin streaming the newly selected version of the content at the position point indicated in update message 165. Network device 110 may send content 180 to user device 120-1.

Figure 2:
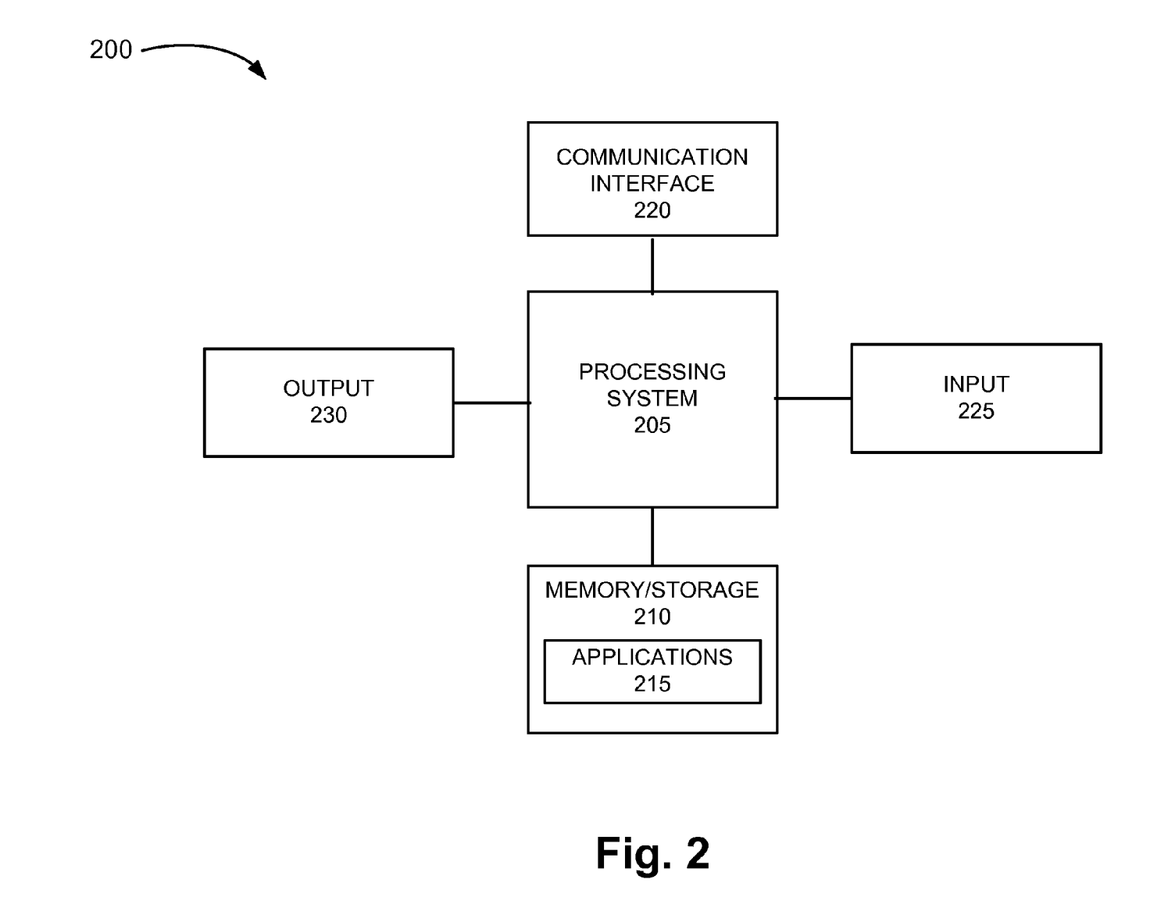
FIG. 2 is a diagram illustrating exemplary components of a device that may include an MPEG-W decoder.

FIG. 2 is a diagram illustrating exemplary components of a device 200 that may include an MPEG-W decoder. For example, device 200 may correspond to components included in network device 110 and user device 120, or other device(s) that may be used in a streaming process. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that may interpret and/or execute instructions and/or data. Depending on the type of processing system 205, processing system 205 may be implemented as hardware, or a combination of hardware and software, may include a memory (e.g., memory/storage 210), etc.

Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple other types of tangible storage mediums. For example, memory/storage 210 may include one or more types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) and a corresponding drive. Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray™ disk (BD), etc.). Memory/storage 210 may store data, application(s), and/or instructions related to the operation of user device 110.

The term "computer-readable medium," as used herein, is intended to be broadly interpreted to include, for example, a memory, a CD, a DVD, a BD, or another type of tangible storage medium.

Applications 215 may include software that may provide various services or functions. For example, with reference to user device 110, applications 215 may include an application that, when executed by processing system 205, may provide the functions of S-MPEG-W decoder 115 and/or D-MPEG-W decoder 125, as described herein.

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s).

Input 225 may permit an input into device 200. For example, input 110 may include a keyboard, a keypad, a touchscreen, a touch pad, a mouse, an input port, a button, a switch, a microphone, a knob, and/or some other type of input.

Output 230 may permit device 200 to provide an output. For example, output 230 may include a display, a speaker, a light (e.g., light emitting diode(s), etc.), an output port, a vibratory mechanism, and/or some other type of output.

Device 200 may perform operation(s) and/or process(es) in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. For example, processes may include processes pertaining to D-MPEG-W decoder 125 and/or S-MPEG-W decoder 115. Alternatively, according to another implementation, device 200 may perform processes based on the execution of hardware (e.g., processing system 205, etc.), the execution of hardware and firmware, or the execution of hardware, software (e.g., applications 215), and firmware.

Figure 3:
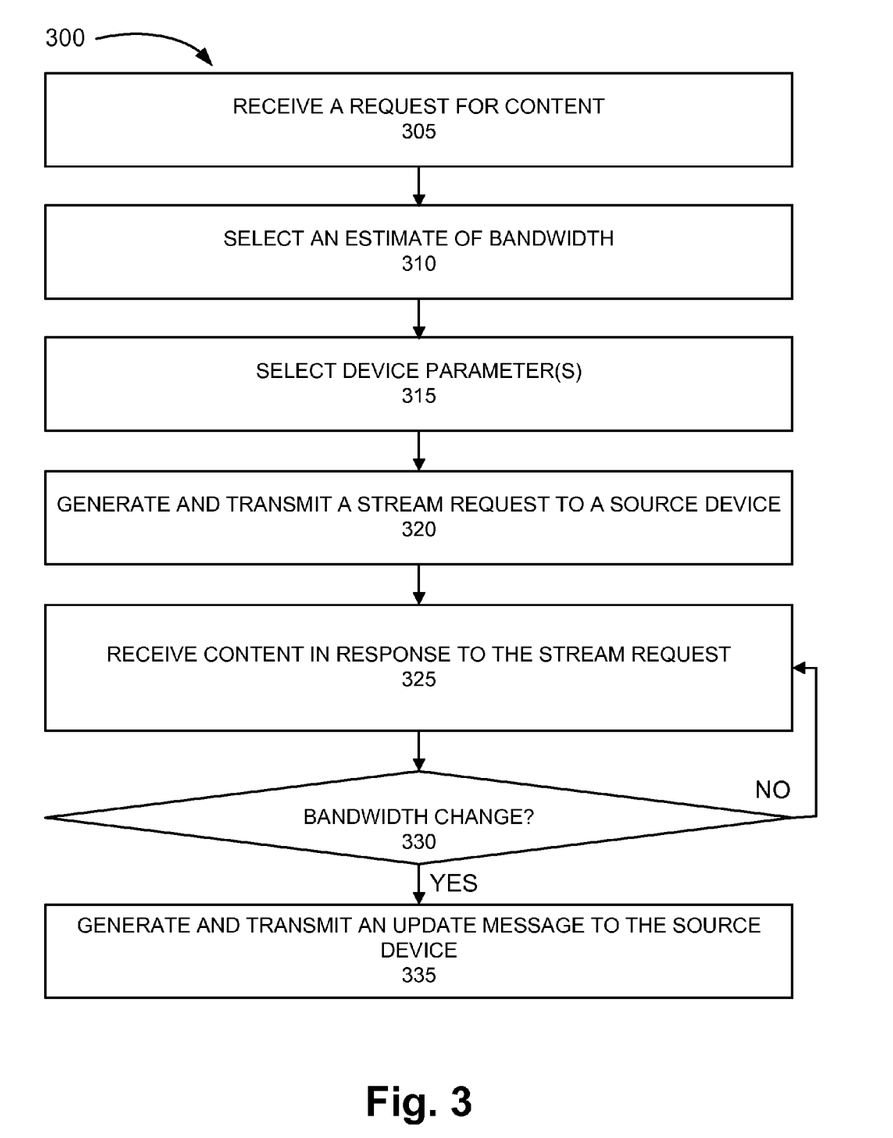
FIG. 3 is a diagram illustrating an exemplary process for streaming content.

FIG. 3 is a flow diagram illustrating an exemplary process 300 for streaming content. According to an exemplary embodiment, one or more operations of process 300 may be performed by D-MPEG-W decoder 125.

Process 300 includes receiving a request for content (block 305). For example, as previously described, D-MPEG-W decoder 125 may receive a request for content. The request may come in the form of a user selecting an MPEG-W link. The MPEG-W link may include an address and the name of content.

An estimate of bandwidth is selected (block 310). For example, as previously described, D-MPEG-W decoder 125 may estimate the bandwidth. The estimate of the bandwidth may be a default bandwidth or a lowest bandwidth. The bandwidth estimate may take the form of a bandwidth value (e.g., 1 Megabytes/second) or range of bandwidth values (e.g., 1 Megabytes/second to 1.25 Megabytes/second).

Device parameter(s) is/are selected (block 315). For example, as previously described, D-MPEG-W decoder 125 may identify other parameters pertaining to the destination device. For example, D-MPEG-W decoder 125 may identify the type of device, size of the display, and/or resolution information, and select the parameter(s) to be included in the stream request.

A stream request is generated and transmitted to a source device (block 320). For example, as previously described, D-MPEG-W decoder 125 may generate a stream request and transmit the stream request to a source device.

Content is received in response to the stream request (block 325). For example, as previously described, the destination device may receive streaming content from S-MPEG-W 115 via the source device.

It is determined whether the bandwidth has changed (block 330). For example, as previously described, D-MPEG-W decoder 125 may continually monitor the current bandwidth associated with a connection between the destination device and the source device. D-MPEG-W decoder 125 may determine that the bandwidth has changed based on the continual monitoring. However, depending on the extent of the bandwidth change, D-MPEG-W decoder 125 may or may not generate and transmit an update message. According to an exemplary implementation, D-MPEG-W decoder 125 may access a table or other data structure that maps bandwidth value(s) to particular content resolutions. Thus, in some cases when the bandwidth change is minimal or would not support a change in content resolution, D-MPEG-W decoder 125 will not generate and transmit the update message, and in cases when the bandwidth change is significant or would support a change in content resolution, D-MPEG-W decoder 125 will generate and transmit the update message. For example, according to an exemplary implementation, D-MPEG-W decoder 125 may access the table or other data structure and select a content resolution based on the current bandwidth. D-MPEG-W decoder 125 may identify the current content resolution associated with the received streaming content. Thereafter, D-MPEG-W decoder 125 may recognize if there is a difference in content resolution between the current content resolution and the content resolution mapped to the current, monitored bandwidth. Thus, if it is determined that the bandwidth has not changed (block 330—NO), process 300 may continue to block 325. However, if it is determined that the bandwidth has changed (block 330—YES), an update message is generated and transmitted to the source device (block 335).

Although FIG. 3 illustrates an exemplary process 300, according to other implementations, process 300 may include additional operations, fewer operations, and/or different operations than those illustrated in FIG. 3 and described herein. For example, depending on the particular circumstances (e.g., destination device state and existing connections, bandwidth estimation technique used, user interaction with destination device, etc.) surrounding the streaming of content, process 300 may be modified.

For example, with reference to blocks 305 to 320, a user may initiate a streaming process according to conventional techniques. For example, a user may connect, via a destination device, to a source device, navigate through interfaces provided by the source device, and select a file for streaming. According to such circumstances, D-MPEG-W decoder 125 may estimate a current bandwidth (block 310) pertaining to the connection between the source device and the destination device, before the user selects the content.

Additionally, for example, with reference to block 310, D-MPEG-W decoder 125 may select an estimate of bandwidth based on other existing connections. For example, D-MPEG-W decoder 125 may identify current bandwidth(s) pertaining to other connections between the destination device and another device. This type of estimation may involve a sniffing process.

Additionally, for example, with reference to block 330 and block 335, D-MPEG-W decoder 125 may identify other parameters that may cause D-MPEG-W decoder 125 to generate and transmit an update message. For example, if a user is playing the content during the streaming process, and the user changes the size of a viewing window (e.g., from a full screen mode to a partial screen mode, or vice versa), D-MPEG-W decoder 125 may generate and transmit an update message that includes a request for a change in resolution. For example, when the viewing window changes from a partial screen to a full screen, D-MPEG-W decoder 125 may request for a higher resolution of the video content, and vice versa when the viewing window changes from a full screen mode to a partial screen mode.

Additionally, as previously described, D-MPEG-W decoder 125 may monitor resource utilization (e.g., processor utilization, memory utilization, network connections, etc.) pertaining to the destination device. For example, for audio content, the user may listen to streaming audio and simultaneously have one or more other active sessions (e.g., web browsing, instant messaging, etc.). Similarly, for video content, the user may be (half) watching a video and simultaneously have one or more other active sessions (e.g., web browsing, etc.). Further, depending on the destination device (e.g., a desktop computer versus a mobile device), the user may have more than one display available. Based on these conditions, the resource utilization may change over time, and D-MPEG-W decoder 125 may generate and transmit an update message based on the available and/or used resources pertaining to the destination device. For example, when the resource utilization increases (e.g., beyond a particular threshold), or resource utilization is mapped to a particular resolution (e.g., in a table or other data structure) that is different than the current content resolution, D-MPEG-W decoder 125 may request for a lower resolution, and when the resource utilization decreases, D-MPEG-W decoder may request for a higher resolution.

Figure 4:
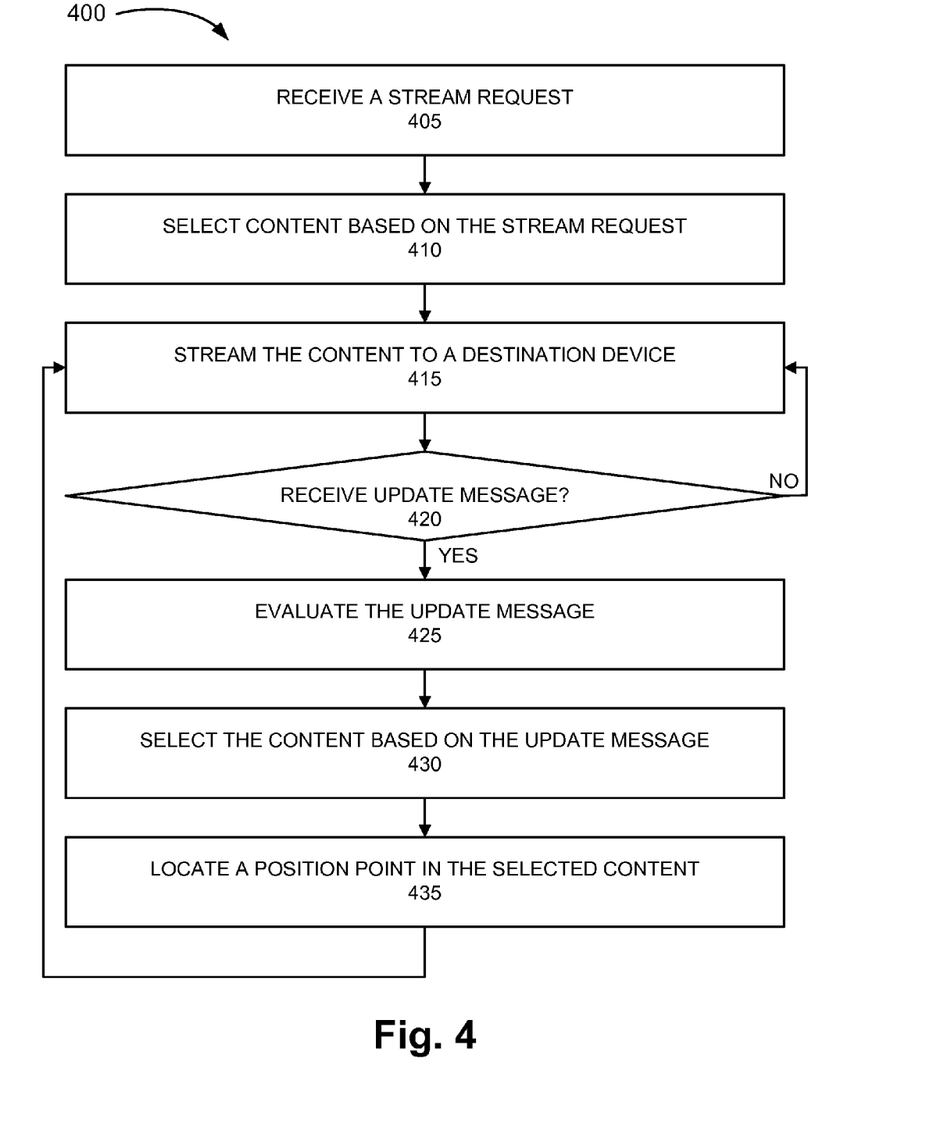
FIG. 4 is a diagram illustrating an exemplary process for streaming content.

FIG. 4 is a diagram illustrating an exemplary process 400 for streaming content. According to an exemplary embodiment, one or more operations of process 400 may be performed by S-MPEG-W decoder 115. Process 400 is described based on operations described in process 300.

Process 400 includes receiving a stream request (block 405). For example, as previously described, S-MPEG-W decoder 115 receives a stream request. The stream request includes an MPEG-W link and an estimate of the bandwidth. The stream request may also include other information pertaining to a destination device.

Content is selected based on the stream request (block 410). For example, as previously described, S-MPEG-W decoder 115 selects the content to stream based on the information included in the stream request.

The content is streamed to a destination device (block 415). For example, as previously described, S-MPEG-W decoder 115 partitions the selected content for streaming based on the packet size available. S-MPEG-W decoder 115 may stream the partitioned content to the destination device via the source device.

It is determined whether an update message is received (block 420). For example, as previously described, S-MPEG-W decoder 115 monitors whether an update message pertaining to the streaming content is received. If it is determined that an update message is not received (block 420—NO), process 400 continues to block 415. That is, S-MPEG-W decoder 115 continues to partition the selected content and source device continues to stream the partitioned content to the destination device.

If it is determined that an update message is received (block 420—YES), the update message is evaluated (block 425). For example, as previously described, S-MPEG-W decoder 115 may evaluate the information included in the update message. By way of example, the update message may indicate a change in current bandwidth and a position point.

Content is selected based on the update message (block 430). For example, as previously described, S-MPEG-W decoder 115 selects the appropriate content based on the update message. For example, S-MPEG-W decoder 115 selects a higher resolution or a lower resolution of the content relative to the resolution of the content currently being streamed. By way of example, the source device may store content. The content may be mapped (e.g., in a data structure or database) to one or more parameters, such as, for example, bandwidth or resolution. S-MPEG-W decoder 115 may select the appropriate content based on this mapping.

A position point in the content may be located (block 435). For example, as previously described, S-MPEG-W decoder 115 may decode or read the selected content to select a (time) position to begin partitioning and streaming the selected content. Once the position is selected, process 400 may continue to block 415, in which the selected content is partitioned and streamed to the destination device.

Although FIG. 4 illustrates an exemplary process 400, according to other implementations, process 400 may include additional operations, fewer operations, and/or different operations than those illustrated in FIG. 4 and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 3 and 4, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
    receiving a request for streaming content designated to a destination device;
    selecting an estimate of a bandwidth for a connection between the destination device and a source device;
    generating a stream request for receiving the streaming content, wherein the stream request includes an Moving Picture Experts Group (MPEG)-W link and the estimate of the bandwidth, wherein the MPEG-W link includes a network address pertaining to the source device, a name of the streaming content, and a file extension of an MPEG-W format;

transmitting the stream request to the source device;
receiving the streaming content from the source device in response to the stream request;
determining whether a change in a current bandwidth associated with the connection between the destination device and the source device supports a change in a resolution of the streaming content;
in response to determining that the change in the current bandwidth associated with the connection supports the change in the resolution of the streaming content, generating a first update message that includes are request for changing the resolution of the streaming content; and
transmitting the first update message to the source device.

2. The method of claim 1, further comprising:
receiving the stream request;
selecting the streaming content based on the stream request, wherein the streaming content has a resolution corresponding to the estimate of the bandwidth; and
streaming the streaming content to the destination device.

3. The method of claim 1, further comprising:
identifying when the streaming content includes video content;
monitoring when a size of a viewing window for playing the streaming content on the destination device changes;
generating a second update message that includes a second request for changing the resolution of the streaming content when the size of the viewing window of the destination device changes; and
transmitting the second update message to the source device.

4. The method of claim 1, wherein the selecting the estimate comprises:
selecting one of a default estimate of a bandwidth derived from a bandwidth connection history or a lowest estimate of a bandwidth derived from a connection capability of the destination device,
wherein the default estimate and the lowest estimate are derived before a connection between the destination device and the source device exists for receiving the streaming content.

5. A device comprising:
one or more memories to store instructions of a Destination Moving Picture Experts Group (D-MPEG)-W decoder; and
one or more processing systems to execute the instructions that configure the one or more processing systems to:
receive a request for streaming content designated to a destination device, wherein the D-MPEG-W decoder is associated with the destination device;
select an estimate of a bandwidth for a connection between the device and a source device;
generate a stream request for receiving the streaming content, wherein the stream request includes an MPEG-W link and the estimate of the bandwidth, wherein the MPEG-W link includes a network address pertaining to the source device, a name of the streaming content, and a file extension of an MPEG-W format;
transmit the stream request to the source device;
receive the streaming content from the source device in response to the stream request;
estimate a current streaming bandwidth during the receiving of the streaming content;
determine whether the current streaming bandwidth supports a change in a resolution of the streaming content;
generate a first update message that indicates the current streaming bandwidth in response to determining that the current streaming bandwidth supports the change in the resolution of the streaming content; and
transmit the first update message to the source device.

6. The device of claim 5, wherein when determining, the one or more processing systems is further configured to:
access a data structure that maps a bandwidth to a content resolution;
select the content resolution in correspondence to the current streaming bandwidth;
identify a current content resolution associated with the streaming content; and
identify whether there is a difference between the current content resolution and the content resolution corresponding to the current streaming bandwidth.

7. The device of claim 5, wherein the one or more processing systems is further configured to:
monitor device resource utilization pertaining to the device, wherein the device resource utilization includes at least one of processor utilization, memory utilization, or information pertaining to current network connections;
select a resolution of the streaming content based on the current resource utilization;
identify a current content resolution of the streaming content;
determine whether there is a difference between the resolution and the current content resolution;
generate a second update message that includes a request for the streaming content having the resolution when there is the difference between the resolution and the current content resolution; and
transmit the second update message to the source device.

8. The device of claim 5, wherein the one or more processing systems is further configured to:
identify when the streaming content includes video content;
monitor when a size of a viewing window for playing the streaming content on the device changes;
generate a third update message that includes a request for changing the resolution of the streaming content when the size of the viewing window of the device changes; and
transmit the third update message to the source device.

9. The device of claim 5, wherein the one or more processing systems is further configured to:
identify whether the requested streaming content includes video content based on the name of the streaming content included in the MPEG-W link, wherein the stream request includes a size of a display pertaining to the device, when the streaming content is identified as video content.

10. The device of claim 5, wherein the device is a mobile communication device.

11. The device of claim 5, wherein the D-MPEG-W decoder is part of a content player capable of playing streaming content.

12. The device of claim 5, wherein when selecting the estimate, the one or more processing systems is further configured to:
select a default estimate of a bandwidth derived from a bandwidth connection history associated with the device, wherein the default estimate is derived before a connection between the device and the source device exists for receiving the streaming content.

13. A device comprising:
one or more memories to store instructions of a Source Moving Picture Experts Group (S-MPEG)-W decoder; and
one or more processing systems to execute the instructions that configure the one or more processing systems to:
receive a stream request designated to a destination device, wherein the stream request includes an MPEG-W link, an estimate of a bandwidth for a connection between the destination device and the device, and a device type pertaining to the destination device, wherein the MPEG-W link includes a network address pertaining to the device, a name of a streaming content, and a file extension of an MPEG-W format;
select a streaming content based on the stream request, wherein the streaming content has a resolution corresponding to the estimate of the bandwidth;
stream the streaming content to the destination device; and
receive an update message that includes an updated estimate of a bandwidth and a position point that indicates a position of the streaming content from a perspective of the destination device.

14. The device of claim 13, wherein the one or more processing systems is further configured to:
select a same streaming content as the streaming content except the same streaming content has a resolution different from the streaming content based on the updated estimate of the bandwidth;
decode the same streaming content;
locate the position point in the same streaming content; and
partition the same streaming content beginning at the position point.

15. The device of claim 14, wherein when selecting the same streaming content, the one or more processing systems is further configured to:
identify a mapping between the updated estimate of bandwidth and the same streaming content; and
select the same streaming content based on the mapping.

16. The device of claim 13, wherein the device is a web server or a peer device relative to the destination device.

17. A non-transitory computer-readable medium comprising instructions for a Destination Moving Picture Experts Group (D-MPEG)-W decoder, which when executed are for:
receiving a request for streaming content designated to a destination device;
selecting an estimate of a bandwidth for a connection between the destination device and a source device based on a bandwidth connection history pertaining to one or more previous streaming sessions;
generating a stream request for receiving the streaming content, wherein the stream request includes an MPEG-W link, the estimate of the bandwidth, wherein the MPEG-W link includes a network address pertaining to the source device, a name of the streaming content, and a file extension of an MPEG-W format;
transmitting the stream request to the source device;
receiving the streaming content from the source device in response to the stream request;
monitoring device resource utilization pertaining to the destination device,
selecting a resolution of the streaming content based on the current resource utilization;
identifying a current content resolution of the streaming content;
determining whether there is a difference between the resolution and the current content resolution;
generating an update message that includes a request for the streaming content having the resolution when there is the difference between the resolution and the current content resolution; and
transmitting the update message to the source device.

18. The non-transitory computer-readable medium of claim 17,
wherein the device resource utilization includes at least one of processor utilization, memory utilization, or information pertaining to current network connections.

19. A non-transitory computer-readable medium comprising instructions for a Source Moving Picture Experts Group (S-MPEG)-W decoder, which when executed are for:
receiving a stream request designated to a destination device, wherein the stream request includes an MPEG-W link and an estimate of a bandwidth, wherein the MPEG-W link includes a network address pertaining to a source device, a name of a streaming content, and a file extension of an MPEG-W format;
selecting a streaming content based on the stream request, wherein the streaming content has a resolution corresponding to the estimate of the bandwidth;
streaming the streaming content to the destination device; and
in response to determining that a change in a current bandwidth associated with the connection supports a change in the resolution, receive an update message that includes a request for the change in the resolution.

* * * * *